(12) United States Patent
Farrington

(10) Patent No.: US 11,102,970 B2
(45) Date of Patent: Aug. 31, 2021

(54) MILLER MOTH KILLING DEVICE

(71) Applicant: Steven R. Farrington, Deer Trail, CO (US)

(72) Inventor: Steven R. Farrington, Deer Trail, CO (US)

( * ) Notice: Subject to any disclaimer, the term of this patent is extended or adjusted under 35 U.S.C. 154(b) by 199 days.

(21) Appl. No.: 16/508,986

(22) Filed: Jul. 11, 2019

(65) Prior Publication Data

US 2021/0007341 A1 Jan. 14, 2021

(51) Int. Cl.
 *A01M 1/04* (2006.01)

(52) U.S. Cl.
 CPC ......... *A01M 1/04* (2013.01); *A01M 2200/012* (2013.01)

(58) Field of Classification Search
 CPC .......... A01M 1/02; A01M 1/04; A01M 1/106; A01M 1/2016; A01M 2200/012
 USPC ................. 43/107, 113, 132.1, 133
 See application file for complete search history.

(56) References Cited

U.S. PATENT DOCUMENTS

| | | | | |
|---|---|---|---|---|
| 2003/0000127 A1* | 1/2003 | Smith | ................... | A01M 1/145 43/113 |
| 2007/0157508 A1* | 7/2007 | Chang | ..................... | A01M 1/06 43/139 |
| 2008/0066372 A1* | 3/2008 | Fleming | .............. | A01M 1/2083 43/113 |
| 2009/0031612 A1* | 2/2009 | Hubbard | ............... | A01M 29/08 43/132.1 |
| 2009/0277074 A1* | 11/2009 | Noronha | ................. | A01M 1/08 43/113 |
| 2012/0297662 A1* | 11/2012 | Strube | ................... | A01M 1/145 43/113 |
| 2013/0152452 A1* | 6/2013 | Lazzarini | ............. | A01M 1/106 43/114 |

* cited by examiner

*Primary Examiner* — David J Parsley
*Assistant Examiner* — Danielle A Clerkley
(74) *Attorney, Agent, or Firm* — Law Office of Mark Levy

(57) ABSTRACT

A pest control device for attracting and exterminating flying insects. A pest control housing is provided with a light source to attract pests, the light source being proximate an access aperture through which pests can fly. The pest control housing has sealable upper and lower structures and attachment means for connecting the upper and lower structures to each other. A power supply operatively connected to the light source is located in the lower structure with a lamp removably attached to a socket within a central location of the lower structure. A container in the housing is filled with a lipid solution for drowning the attracted flying insects.

5 Claims, 2 Drawing Sheets

MILLER MOTH KILLING DEVICE

RELATED APPLICATION

The present invention was first described in and claims the benefit of U.S. provisional patent application No. 62/684,973 filed 14 Jun. 2018, the entire disclosure of which is incorporated herein by reference.

FIELD OF THE INVENTION

The present invention relates generally to insect control devices and, in particular, to an apparatus for exterminating flying insects.

BACKGROUND OF THE INVENTION

The presence of unwanted Miller moth is a prominent annoyance, especially during peak times such as the summer months. Miller moth populations is especially an issue in outdoor settings such as camping sites, porches, picnics, but are especially annoying in the home.

A so-called Miller moth is any type of moth that is particularly abundant in and around homes. In the eastern half of Colorado and pans of Wyoming, the common "miller" is the adult stage of the army cutworm, Euxoa auxiliaris. All moths have fine scales that cover their wings. These scales rub off easily and remind people of the dusty flour that covers the clothing of one who mills grain; hence the name, "millers." Army cutworms in their caterpillar stage in high populations, have a habit of banding together in army-like groups, crawling across fields or highways in large numbers.

Other regional insects share this habit of forming large bands, including Mormon crickets, true armyworms, and forest tent caterpillars. Army cutworm moths have 1½- to 2-inch wings. Eggs are laid by the moths in late summer and early fall in weedy areas of wheat fields, alfalfa fields, or other areas where vegetation is thick. The eggs hatch within a few weeks and the young caterpillars begin to feed. Army cutworms spend the winter as partially-grown caterpillars, and resume feeding the following spring. At this time the cutworms may damage crops, including alfalfa, winter wheat (after the broadleaf weeds are mostly gone), and gardens. They become full grown by mid spring, burrow into the soil and pupate. Between three to six weeks later, the adult "miller" stage of the insect emerges.

The moths then migrate and ultimately settle at higher elevations, spending a few months, feeding on nectar and resting in sheltered areas, such as under the rocks of talus slopes. During this time they are in reproductive diapause (inactivity), and do not lay eggs. In late summer, they return to the lower elevations to lay eggs and repeat the cycle. During outbreak years, miller moth flights may last five to six weeks, generally starting the last week of May or early June. Some suggestions for controlling miller moths are to seal any obvious openings around the home where they can hide, particularly around windows and doors.

Once Miller moths are in the home, the best ways to remove them are to swat them, vacuum them, or attract them to traps. The present applicant has discovered that an easy trap to make is to carefully suspend a light bulb over a bucket or tub partially filled with soapy water. Some wetting agent, such as soap or detergent must be added to the water or many moths will escape. Moths attracted to the light will fall into the soapy water and be killed. Jingling keys can sometimes dramatically speed the capture rate when using the soapy-water trap Insecticides have little or no place in controlling millers because the insects are not very susceptible to insecticides.

DESCRIPTION OF RELATED ART

Many different methods are utilized in an attempt to control Miller moth presence in the home. These methods include scented candles and torches, insect repellents, insect traps, insecticides, and the like. Another popular device is that of electrical insect lures which generally utilize light as an attracting means and provide elimination capabilities for the extermination of insect populations via electrical shock. However, such devices are limited in their scope of capabilities primarily due to the electric grid sizes as compared with the size of the Miller moth itself. Various attempts have been made to provide household Miller moth elimination.

U.S. Pat. No. 3,986,292, issued to Klebanoffon Oct. 19, 1976 for INSECT KILLING DEVICE, describes an electrical insect killer connectable to a source of domestic alternating current and having a condenser chargeable from the current source through a current pulse transformer. The condenser plates are connected to a grid, the conductive elements of which are spaced apart a distance to be short circuited by an insect. The insect is electrocuted by discharge of the condenser.

U.S. Pat. No. 6,594,946, issued to Nolen et al. on Jul. 22, 2003 for MOSQUITO AND BITING INSECT ATTRACTING AND KILLING APPARATUS, describes a mosquito and biting insect attracting apparatus that includes a heat element (a thermal lure), a source of carbon dioxide (CO), and a source of a chemical biting insect attractant, such as octenol. The heat for the thermal lure and the source of $CO_2$ are provided by a propane flame. The thermal lure includes a structure that surrounds a propane burner and that is heated by the burner to a temperature that is similar to that of a small animal, such as 95° F. to 115° F. The structure includes a series of baffles and conduction elements that permit the structure to have a substantially constant heat signature, which is desirable for attracting mosquitoes and other biting insects. A mechanism may be provided for trapping or killing the attracted mosquitoes, such as an adhesive substance or an electronic grid.

U.S. Pat. No. 8,319,649, issued to Devane on Nov. 27, 2012 for INSECT ELECTROCUTION DEVICE WITH COUNTER, describes an electronic insect electrocution device with an integral display and counting means that displays the number of discharges, or "zapped" insects. The device comprises a lamp enclosed within an enclosure comprising series of alternating grids energized by a voltage increasing device, which electrocutes any insects that fly towards the lamp. A numeric digital display is provided on the top of the enclosure and reflects the current number of discharges or killed insects. The counter is provided with an input signal that detects the voltage fluctuation of the grid every time an insect is killed. This detection circuit drives a counting circuit which interfaces with the counter and is reset every time the unit is unplugged.

In view of the foregoing references, the present inventor recognized the aforementioned inherent problems with current insect control devices and realized a need for a means to provide a Miller moth killing device that has the added utility of attracting flying insects within the home.

SUMMARY OF THE INVENTION

To achieve the above objectives, it is an object of the present invention to attract Miller moths and to provide a tank containing a lipid solution that is absorbed by the scales on the wing of the Miller moth, thereby making it unable to fly, the Miller moth then drowning in the tank to be removed at a later time.

Another object of the present invention is to provide a durable waterproof structure which consists of upper and lower structures integrally attached via a light post, which creates a bowl shaped body with a lid threaded onto the light post to seal the unit for disposal of the contents of the structure.

Another object of the present invention is to provide the Miller moth insect attracting feature of a replaceable lamp which comprises an insect attracting illuminating device such as a fluorescent lamp, neon lamp, ultraviolet lamp, or the like.

Yet another object of the present invention is to provide a threaded light post and O-rings that allow the unit to be sealed for disposal.

Yet still another object of the present invention is to provide a method of utilizing the device, including means for powering the apparatus via a conventional power outlet, attracting the Miller moths.

Further objects and advantages of the present invention will become apparent from a consideration of the drawings and ensuing description.

In accordance with the present invention, there is provided a pest control device for attracting and exterminating flying insects. A pest control housing is provided with a light source to attract pests, the light source being proximate an access aperture through which pests can fly. The pest control housing has sealable upper and lower structures and attachment means for connecting the upper and lower structures to each other. A power supply operatively connected to the light source is located in the lower structure with a lamp removably attached to a socket within a central location of the lower structure. A container in the housing is filled with a lipid solution for drowning the attracted flying insects.

BRIEF DESCRIPTION OF THE DRAWINGS

A complete understanding of the present invention may be obtained by reference to the accompanying drawings, when considered in conjunction with the subsequent detailed description, in which.

Like reference numerals refer to like parts throughout the several views of the drawings.

DETAILED DESCRIPTION OF THE PREFERRED EMBODIMENT

Although the following detailed description contains specific details for the purposes of illustration, those of ordinary skill in the art will appreciate that variations and alterations to the following details are within the scope of the invention. Accordingly, the exemplary embodiments of the invention described below are set forth without any loss of generality to, and without imposing limitations upon, the claimed invention.

Figure 1:
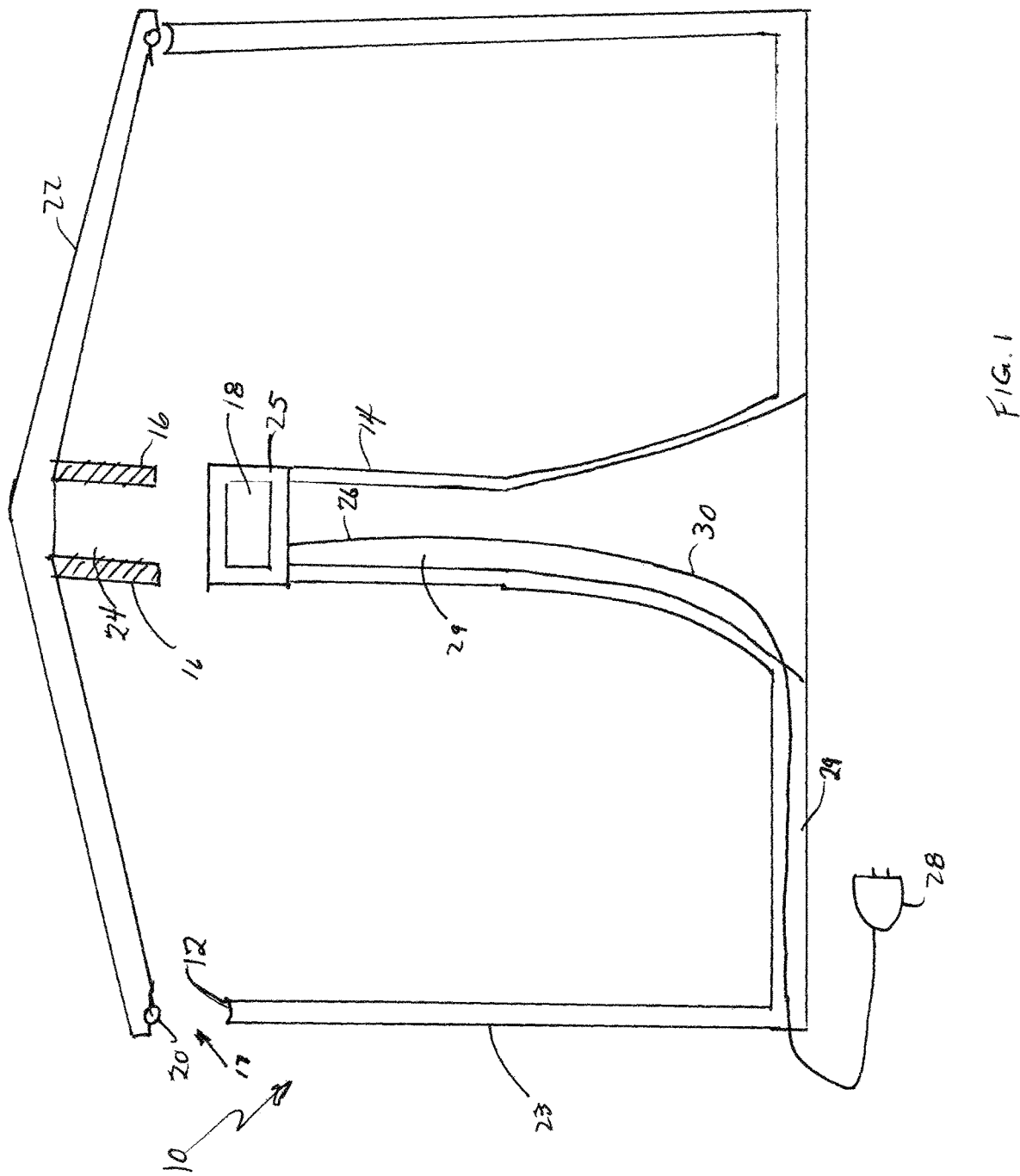
FIG. 1 is a side perspective view of a Miller moth killing device, according to a preferred embodiment of the present invention.
Figure 2:
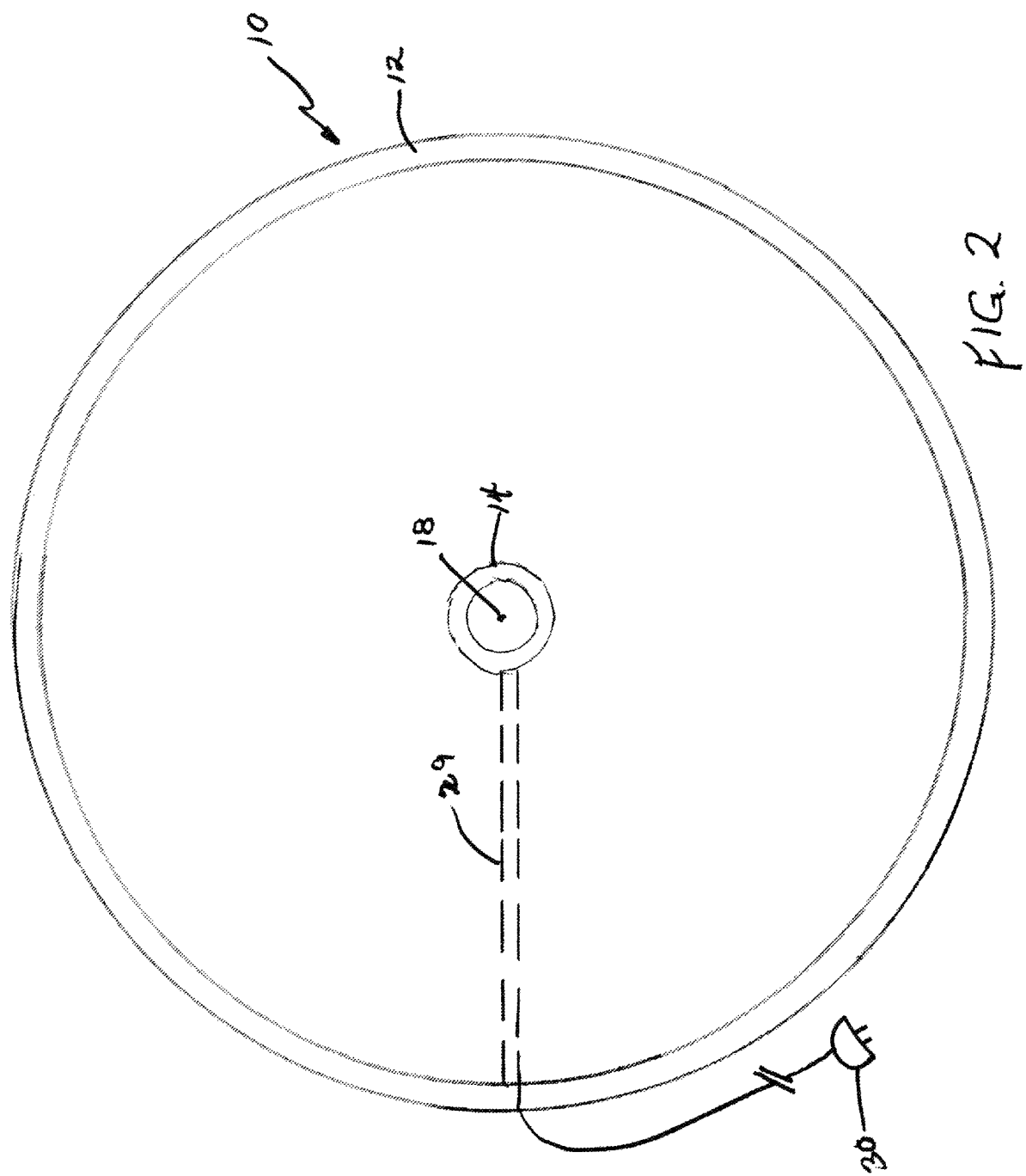
FIG. 2 is an overhead perspective view of a Miller moth killing device shown in FIG. 1.

The best mode for carrying out the invention is presented in terms of its preferred embodiment, herein depicted within FIGS. 1 and 2. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention. Only one particular configuration is shown and described herein for purposes of clarity and disclosure and not by way of limitation of scope.

The present invention describes an insect elimination device with counter (herein described as the "apparatus" or "device") specifically designed for the elimination/killing of Miller moths but will attract and eliminate any flying insect, which provides a lipid-containing liquid reservoir as a means for controlling Miller moth/insect populations and their disposal. Such flying insects also include by are not limited to Mormon crickets, true army worms, and forest tent caterpillars.

The inventive apparatus may be located indoors or outdoors, and is ideal for persons with allergic reactions to insect bites, and those who have an aversion to insect repellants.

Referring now to the figures, the Miller moth killing device apparatus 10 comprises a strong and durable waterproof upper structure or lid 22 and a lower structure 23. By utilizing a threaded feature 16 of upper structure 22, a gap 17 is created between the upper and lower structures 22, 23. Lower structure 23, an O-ring channel 12, a threaded light post 14, a light chamber 18, and a channel 29 for the electrical cord 30 are preferably integrally molded to each other, yet other means of attachment may be utilized without limiting the functions of the apparatus. Upper structure 22 of apparatus 10 and a threaded pocket 24 are also preferably integrally molded to each other, yet other means of attachment may be utilized without limiting the functions of apparatus 10. Upper structure 22 and lower structure 23 create a substantially cylindrical-shaped body, yet bodies with other shapes may be utilized without limiting the scope of the invention. Upper structure 22 and lower structure 23 are fabricated from materials such as, but not limited to metal, plastic, or the like.

Upper structure 22 and lower structure 23 are depicted as being separated for illustration purposes only, but these features are preferably integrally molded to each other, thereby providing structural integrity to apparatus 10 as a whole. An interior portion of apparatus 10 houses a lamp 18 contained within threaded light post 14, thereby providing a means of luring insects that are attracted to its illumination. Lamp 18 is located at an interior intermediate location within apparatus 10 and is surrounded by a lipid solution 25 utilized to drown Miller moths. Lamp 18 is an illuminating device utilized in common insect electrocution devices and illumination devices such as, but not limited to: fluorescent lamps, neon lamps, ultraviolet lamps, or the like.

Lower structure 23 having light post 14 includes an access aperture, not shown, for replacing lamp 18. Lower structure 23, being a waterproof vessel, contains the remains of the Miller moths. As Upper structure 22 includes an O-ring 20 with a threaded pocket 24, it may be tightened to lower structure 23 by utilizing threaded post 14. Upper and lower structures 22, 23 are then a sealed unit as O-ring 20 seals the two assemblies by means of the O-ring channel 12, creating a waterproof seal with O-ring 20. Apparatus 10 may then be transported to a sink, toilet, or other location, not shown, for disposal.

Intermediately positioned on an underside surface of upper structure 22 is light post 14 which secures lamp 18 thereto and supplies current to lamp 18 via an electrical lead 26. A socket, not shown, within light post 14 and lamp chamber 18 is preferably attached to lower structure 23 via integral molding, but other attachment means may be utilized without limiting the scope of the invention.

Apparatus 10 receives 110-VAC electrical power via plugging power plug 28 into a suitable household electrical outlet, not shown, which directs current to lamp 18. When an insect flies through the gap between the upper and lower structures 22, 23, many will fly directly into lipid solution 25. Others will fly into upper structure 22 and, hitting light post 14, will turn and fly into lipid solution 25. In any event, the vast majority of Miller moths/insects that fly into apparatus 10 will fly into lipid solution 25 and the lipids will absorb into the scales on the insects' wings making it impossible for them to fly out. The Miller moths will therefore drown in lipid solution 25.

It is envisioned that other styles and configurations of the present invention can be easily incorporated into the teachings of the present invention, and only one particular configuration shall be shown and described for purposes of clarity and disclosure and not by way of limitation of scope. The preferred embodiment of the present invention can be utilized by the common user in a simple and effortless manner with little or no training.

The method of utilizing apparatus 10 may be achieved by performing the following steps: acquiring the apparatus; filling lower structure 23 to the fill line with the lipid solution; threading upper structure 22 onto lower structure 23 by means of threaded pocket 24 and threaded light post 18; locating apparatus 10 in a location most likely to attract and exterminate Miller moths; supplying current to apparatus 10 via electrical lead 30 and plug 28, which illuminate lamp 18. The following morning, apparatus 10 is sealed by screwing down upper structure 22 onto lower structure 23, engaging O-ring 20 into O-ring channel 12. Apparatus 10 may then be transported to a toilet, sink, or other location to be opened and the contents disposed of.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a great number of variations of the devices, device components, and method steps set forth in the present description. As will be obvious to one of skill in the art, methods and devices useful for the present methods can include a great number of optional composition and processing elements and steps.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when compositions of matter are claimed, it should be understood that compounds known and available in the art prior to Applicant's invention, including compounds for which an enabling disclosure is provided in the references cited herein, are not intended to be included in any composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising," "consisting essentially of," and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials and methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Having thus described the invention, what is desired to be protected by Letters Patent is presented in the subsequently appended claims:

1. A flying pest control device, comprising:
   a) a sealable pest control housing, comprising a light source having a lamp and socket to attract pests, the light source being proximate a gap through which pests can fly, the pest control housing comprising an upper structure, a lower structure, and attachment means for connecting the upper and lower structures to each other;

b) a power supply operatively connected to the light source located in the lower structure with the lamp removably attached to the socket within a central location of the lower structure; and c) a lipid solution container retaining a lipid solution and substantially surrounding the light source in the lower structure;

wherein the gap is formed between the upper structure and the lower structure; and the pest control housing is sealed when the attachment means brings the upper structure and the lower structure together and closes the gap.

2. The flying pest control device in accordance with claim 1, wherein the pest control housing comprises a lantern-shaped molded structure comprising a resilient and durable waterproof material.

3. The flying pest control device in accordance with claim 1, wherein the lamp comprises at least one illuminating device consisting of: a fluorescent lamp, a neon lamp, and an ultraviolet lamp.

4. A flying pest control device, comprising:

a) a sealable device housing, comprising a lantern-shaped molded structure comprising a resilient and durable waterproof material, the device housing comprising:

i) an upper structure comprising an O-ring to seal the flying pest control device for disposal;

ii) a lower structure engageable with the upper structure, the lower structure having a threaded pocket to facilitate the sealing thereof;

iii) a lipid solution container in the lower structure and having a lipid solution therein;

iv) a gap for removing debris from within the device housing and providing access into the flying pest control device for pests to be exposed to the lipid solution;

v) a power supply; and vi) a lamp removably attached to a socket mounted in the lower structure;

wherein the device housing is sealed when the upper structure is engaged with the threaded pocket of the lower structure and the O-ring closes the gap.

5. A method for exterminating flying pests, the steps comprising:

a) providing an upper structure of a flying pest control apparatus and a lower structure thereof;

b) filling the lower structure of the flying pest control apparatus to a fill line with a lipid solution;

c) threading the upper structure of the flying pest control apparatus onto the lower structure by means of a threaded pocket and a threaded light post, creating a gap formed between the upper structure and the lower structure;

d) placing the flying pest control apparatus in a location most likely to attract flying insects;

e) supplying current to the flying pest control apparatus via an electrical lead and plug to illuminate a lamp located in the lower structure;

f) sealing the flying pest control apparatus by screwing down the upper structure onto the lower structure thereof, engaging an O-ring on the upper structure into an O-ring channel on the lower structure; and g) transporting the flying pest control apparatus to a disposal location.

* * * * *